United States Patent [19]

Ferrar

[11] 3,937,683
[45] Feb. 10, 1976

[54] COHESIVE COATING COMPOSITIONS

[75] Inventor: Andrew Nicholas Ferrar, Bridgwater, England

[73] Assignee: British Cellophane Limited, England

[22] Filed: Nov. 19, 1973

[21] Appl. No.: 417,406

[30] Foreign Application Priority Data
Nov. 23, 1972 United Kingdom............... 54237/72

[52] U.S. Cl........ 260/42.47; 260/4 R; 260/29.7 UA; 260/42.55; 260/887; 428/492; 428/517; 428/519; 428/520
[51] Int. Cl.²......................... C08J 3/20; C08K 3/34
[58] Field of Search.............. 260/4, 42.47, 29.7 UA

[56] References Cited
UNITED STATES PATENTS

| | | | |
|---|---|---|---|
| 2,785,143 | 3/1957 | Edgerley | 260/4 R |
| 2,880,185 | 3/1959 | Lee | 260/4 R |
| 3,132,041 | 5/1964 | Pihl | 260/4 R |
| 3,380,938 | 4/1968 | Jack | 260/4 R |
| 3,432,339 | 3/1969 | Howell et al. | 260/4 R |
| 3,714,107 | 1/1973 | Smith | 260/42.47 |

*Primary Examiner*—John C. Bleutge
*Attorney, Agent, or Firm*—Watson, Cole, Grindle & Watson

[57] ABSTRACT

A cohesive coating composition comprises in dispersion in a liquid a mixture of between 51 and 99% by weight of a natural or synthetic rubber and between 1 and 49% by weight of a polyalkyl methacrylate in which dispersion there is incorporated between 5% and 35% by weight, based on the weight of the solids, of an inert particulate material having a mean particle size lying in the range between 0.2 and 50 microns.

The compositions are applied to sheet materials used, for example, in packaging.

1 Claim, No Drawings

COHESIVE COATING COMPOSITIONS

This invention relates to cohesive coating compositions, that is, coating compositions which when coated on one side of a suitable sheet material such as flexible films or paper, permit the sheet materials to be firmly sealed together, coated side to coated side, under pressure at ambient temperature but do not seal to any significant degree under pressure when the sheet materials are placed coated side to non-coated side.

Such cohesive compositions are well-known and are particularly useful in packaging applications where conventional heat-sealing gives rise to difficulties, for example in the packaging of chocolate or iced confections. The compositions are usually based upon a natural or synthetic rubber and it is important in practice that the composition adheres strongly to its base sheet material to ensure that strong seals are obtained. It is also important that there is no blocking between the uncoated and coated sides of the sheet material when it is wound in roll form otherwise smooth unwinding on packaging machinery is adversely affected and, when the sheet material is surface printed, ink transfer may occur.

The present invention is concerned with cohesive coating compositions having improved properties particularly in respect of antiblocking and anchorage to base sheet materials.

According to the present invention there is provided a cohesive coating composition comprising in dispersion in a liquid a mixture of between 51 and 99% by weight of a natural or synthetic rubber and between 1 and 49% by weight of a polyalkyl methacrylate in which dispersion there is incorporated between 5% and 35% by weight, based on the weight of the solids, of an inert particulate material having a mean particle size lying in the range between 0.2 and 50 microns.

In a more preferred form of the invention the natural or synthetic rubber is present in the mixture in the range between 70 and 90% by weight and the polyalkyl methacrylate in the range between 10 and 30% by weight.

Preferably a suitable stabiliser and a conventional antioxidant and preservative are also added to the mixture. The synthetic rubber may, for example, be a carboxylated styrene butadiene rubber.

The inert particulate material preferably is present in the range between 10% and 25% by weight based on the solids in the dispersion. It may be a plastics material such as polyvinyl chloride but preferably it is of a mineral origin, for example glass spheres, which may be solid or hollow such as is marketed as "Ballotini" or, more preferably, hydrated aluminum silicate. If the mean particle size of the particulate material is below about 0.2 microns then there is a tendency for blocking to occur when the surface of a sheet material, for example a film, coated with the composition is pressed against an uncoated surface of the substrate, for example when a single side coated substrate is wound into a roll. If, however, the mean particle size of the particulate material is above about 50 microns there is a fall off of the cohesive properties of the composition. Preferably the mean particle size of the particulate material lies within the range between 2.0 and 20 microns.

A preferred polyalkyl methacrylate is poly n-butyl methacrylate.

The coating composition may be applied to the surface of any of the conventional sheet wrapping materials by any of the conventional coating methods, for example by means of gravure rollers, flexographic plates or air-knife doctoring techniques. Examples of suitable sheet wrapping materials are plastics films, such as high density and low density polyethylene and polypropylene films, cellulose film or paper. The plastics film may be surface treated with corona discharge or other known oxidising treatment to render the surface receptive and more adherent to the coating composition.

The invention also includes a method for the production of a cohesive coated sheet wrapping material comprising coating a sheet wrapping material with a cohesive coating composition in accordance with the invention followed by drying the composition and sheet wrapping material when produced by such method.

The invention will now be further illustrated by the following Examples:

EXAMPLE 1

350 grams of a natural rubber latex containing 60% by weight solids and incorporating a conventional stabiliser and antioxidant and preservative (marketed by Revertex Limited of Harlow, Essex as "Revertex B 1850/1") was mixed with 75 grams of a high pH stable poly n-butyl methacrylate latex containing 50% by weight solids (marketed as "VINACRYL 4290" by Vinyl Products Limited, Carshalton, Surrey), 50 grams of a hydrated aluminum silicate having a particle size predominantly in the range between 2 and 10 microns and an average particle size of 4.5 microns (marketed as "HYDRITE Flat D" by the Georgia Kaolin Company Ltd., New Jersey, United States of America) and 240 grams of deionised water. The mixture was stirred gently with care being taken not to coagulate the solids.

The mixture was then coated on one side of a vinylidene chloride copolymer coated cellulose film and the coating was doctored with an air-knife to provide after drying a solid coating having a weight of 2.5 grams per square meter. The drying was effected by infra red heat.

The seal strength of the coated film was determined by cutting sample strips 1½ inches in width, pressing a portion of two such aligned strips together, coated side to coated side, between a pair of sealing jaws at room temperature and then determining the force required to peel the strips apart at the seal.

On using a pressure of 40 pounds per square inch for one second between flat sealing jaws the average seal strength taken from five sealed strips was 220 grams per 1½ inches width. On using a pressure of 64 pounds per square inch for one second between crimp sealing jaws the average seal strength was found to be 280 grams per 1½ inches width.

On repeating the seal strength measurements on strips seven days after coating the seal strengths were found to be 280 grams per 1½ inches width for flat jaw sealing and 350 grams per 1½ inches width for crimp jaw sealing.

Further, a roll of the coated film which had been stored for four weeks was found to unwind with substantially no sticking.

EXAMPLE 2

The following ingredients were added to a mixing vessel one at a time in the listed order and thoroughly mixed by gentle stirring before the addition of the next ingredient.

| Parts solids by weight | |
| --- | --- |
| Natural rubber latex stabilised with ammonium caseinate and including butylated hydroxy toluene (antioxidant) and 1:2 benzisothiazolone (preservative) | 58 |
| Ethylene oxide fatty alcohol condensate (stabiliser) marketed as "VULCASTAB-LW" by Imperial Chemical Industries Ltd. | 0.1 |
| Poly n-butyl methacrylate latex containing 10% dibutyl phthalate (plasticiser) -, "VINACRYL 4290" | 16 |
| Hydrated aluminum silicate particles of size in the range between 2 and 10 microns - "HYDRITE FLAT D" | 26 |

Sufficient de-ionised water was then added to provide a dispersion containing 53% solids by weight.

The dispersion was coated on to one side of a vinylidene chloride copolymer coated cellulose film by means of a rotatable engraved roller dipping into a bath of the dispersion. The roller was doctored with a doctor blade placed at an angle reverse to that which is conventional whereby the edge of the blade was set in opposition to the direction of travel of the roller. The coating was applied at a rate to provide 5.6 grams dry solids per square meter and drying of the coating was effected by hot air.

The seal strength of the coated film was determined in the manner described in Example 1 after 24 hours, after seven days and after three weeks using flat sealing jaws at a pressure of 40 pounds per square inch for one second and crimp sealing jaws at a pressure of 64 pounds per square inch for 0.8 seconds.

The seal strengths obtained in grams per 1½ inches width were as follows:

| | Flat jaws | Crimp jaws |
| --- | --- | --- |
| 24 hours | 70 | 125 |
| 7 days | 320 | 260 |
| 3 weeks | 460 | 290 |

It was also found that a roll of the coated film which had been stored for four weeks was found to unwind with substantially no blocking. Further, chocolates sealed in pouches of film coated with the coating composition showed no sign of odour or taint after three months.

EXAMPLES 3 to 8

The cohesive composition as prepared in accordance with Example 2 was coated on one side of six different sheet materials and was doctored by hand using a K-bar to provide after drying a solid coating having a weight of 3.0 grams per square meter.

The seal strengths of the coated materials were determined after 24 hours, 7 days and 3 weeks using flat seal jaws and crimp seal jaws under the same conditions as described in Example 2 with the results set out in the following Table.

TABLE

| Example No. | Sheet material | Seal strength in grams/1½ inches width | | | | | |
| --- | --- | --- | --- | --- | --- | --- | --- |
| | | 24 hrs. | | 7 days | | 3 weeks | |
| | | Flat | Crimp | Flat | Crimp | Flat | Crimp |
| 3. | Low density polyethylene (corona discharge treated) | 280 | 320 | 330 | 360 | 390 | 300 |
| 4. | High density polyethylene (corona discharge treated) | 330 | 400 | 300 | 390 | 410 | 410 |
| 5. | Biaxially orientated polypropylene (corona discharge treated) | 475 | 460 | 390 | 420 | 300 | 360 |
| 6. | Vegetable parchment paper. | 450 | 695 | 470 | 700 | 440 | 1020 |
| 7. | Aluminium foil | 530 | 770 | 540 | 680 | 570 | 700 |
| 8. | Ethylene/propylene copolymer coated polypropylene | 300 | 370 | 390 | 510 | 570 | 430 |

I claim:

1. A cohesive coating composition comprising in dispersion in a liquid a mixture of between 70 and 90% by weight of carboxylated styrene butadiene rubber and between 10 and 30% by weight of poly-n-butyl methacrylate in which dispersion there is incorporated between 10% and 25% by weight, based on the weight of the solids, of particulate hydrated aluminum silicate having a mean particle size lying in the range between 2.0 and 20 microns.

* * * * *